(12) United States Patent
Kumar et al.

(10) Patent No.: US 10,289,926 B2
(45) Date of Patent: May 14, 2019

(54) TARGET OBJECT COLOR ANALYSIS AND TAGGING

(71) Applicant: ACCENTURE GLOBAL SOLUTIONS LIMITED, Dublin (IE)

(72) Inventors: Amioy Kumar, Bangalore (IN); Madhura Shivaram, Bangalore (IN); Nagendra K Kumar, Madanapalle (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 251 days.

(21) Appl. No.: 15/585,893

(22) Filed: May 3, 2017

(65) Prior Publication Data

US 2018/0322359 A1 Nov. 8, 2018

(51) Int. Cl.
*G06K 9/00* (2006.01)
*G06K 9/46* (2006.01)
*G06K 9/62* (2006.01)

(52) U.S. Cl.
CPC ......... *G06K 9/4652* (2013.01); *G06K 9/6267* (2013.01)

(58) Field of Classification Search
CPC ............................ G06K 9/4652; G06K 9/6267
USPC ........................................................ 382/165
See application file for complete search history.

(56) References Cited

U.S. PATENT DOCUMENTS

| 6,578,017 B1 | 6/2003 | Ebersole et al. |
| 7,657,100 B2 | 2/2010 | Gokturk et al. |
| 2013/0300761 A1* | 11/2013 | Ahmed .................... G01J 3/463 345/595 |
| 2015/0186965 A1* | 7/2015 | Paul ....................... G06F 16/381 705/26.41 |
| 2015/0379003 A1* | 12/2015 | Dorner .................... G06F 16/58 707/772 |
| 2016/0110794 A1 | 4/2016 | Hsiao et al. |
| 2016/0162497 A1 | 6/2016 | Cho et al. |
| 2018/0144387 A1* | 5/2018 | Miller ................ G06Q 30/0603 |

(Continued)

FOREIGN PATENT DOCUMENTS

EP 1087614 A2 3/2001

OTHER PUBLICATIONS

GitHub, "Color Extractor", download date May 3, 2017, pp. 5. https://github.com/algolla/color-extractor.

(Continued)

*Primary Examiner* — Jerome Grant, II
(74) *Attorney, Agent, or Firm* — Mannava & Kang, P.C.

(57) ABSTRACT

In some examples, target object color analysis and tagging may include ascertaining an attribute of an image, and determining, based on the ascertained attribute, a target object that is to be identified and color tagged in the image. Based on a learning model, a plurality of objects may be extracted from the image. Based on a comparison of the target object and the plurality of extracted objects, the target object may be identified in the image. Color information may be extracted from the identified target object, and a plurality of color tags associated with the identified target object may be ascertained. A plurality of color distances may be determined between the color information and the plurality of color tags. Based on a determination of a minimum color distance from the plurality of color distances, a color tag that is to be assigned to the identified target object may be determined.

20 Claims, 5 Drawing Sheets

(56) References Cited

U.S. PATENT DOCUMENTS

2018/0174220 A1* 6/2018 Jadhav .............. G06Q 30/0631

OTHER PUBLICATIONS

ApiCloud.Me, "ColorTag API Documentation", download date May 3, 2017, pp. 3. http://apicloud.me/apis/colortag/docs/.
Smith, et al., "Single Color Extraction and Image Query", Washington, DC, Oct. 1995, pp. 4. http://www.ee.columbia.edu/in/dvmm/publications/95/smith95b.pdf.
Charles Leifer, "Using python and k-means to find the dominant colors in images", Oct. 23, 2012, pp. 10. http://charlesleifer.com/blog/using-python-and-k-means-to-find-the-dominant-colors-in-images/.

* cited by examiner

400

ASCERTAIN, FOR AN IMAGE OR VIDEO THAT IS TO BE ANALYZED, AN ATTRIBUTE OF THE IMAGE OR THE VIDEO
402

DETERMINE, BASED ON THE ATTRIBUTE OF THE IMAGE OR THE VIDEO, A TARGET OBJECT THAT IS TO BE IDENTIFIED AND COLOR TAGGED IN THE IMAGE OR THE VIDEO
404

EXTRACT, BASED ON A LEARNING MODEL, A PLURALITY OF OBJECTS FROM THE IMAGE OR THE VIDEO
406

IDENTIFY, BASED ON A COMPARISON OF THE TARGET OBJECT THAT IS TO BE IDENTIFIED AND COLOR TAGGED IN THE IMAGE OR THE VIDEO AND THE PLURALITY OF EXTRACTED OBJECTS FROM THE IMAGE OR THE VIDEO, THE TARGET OBJECT IN THE IMAGE OR THE VIDEO
408

EXTRACT COLOR INFORMATION FROM THE IDENTIFIED TARGET OBJECT
410

ASCERTAIN A PLURALITY OF COLOR TAGS ASSOCIATED WITH THE IDENTIFIED TARGET OBJECT
412

DETERMINE A PLURALITY OF COLOR DISTANCES BETWEEN THE COLOR INFORMATION AND THE PLURALITY OF COLOR TAGS
414

DETERMINE, BASED ON A DETERMINATION OF A MINIMUM COLOR DISTANCE FROM THE PLURALITY OF COLOR DISTANCES, A COLOR TAG OF THE PLURALITY OF COLOR TAGS THAT IS TO BE ASSIGNED TO THE IDENTIFIED TARGET OBJECT
416

FIG. 4

TARGET OBJECT COLOR ANALYSIS AND TAGGING

BACKGROUND

An image may include various objects that include a variety of colors. For example, an object may include an element such as a person, an animal, clothing worn by a person, furniture near a person, etc. An object may also include a region of the image, such as the sky, a forest, a road, etc. An image may include background colors that separate an object in the image from other objects in the image.

BRIEF DESCRIPTION OF DRAWINGS

Features of the present disclosure are illustrated by way of example and not limited in the following figure(s), in which like numerals indicate like elements, in which:

FIG. 4 illustrates a flowchart of an example method for target object color analysis and tagging in accordance with an example of the present disclosure.

DETAILED DESCRIPTION

Figure 1:
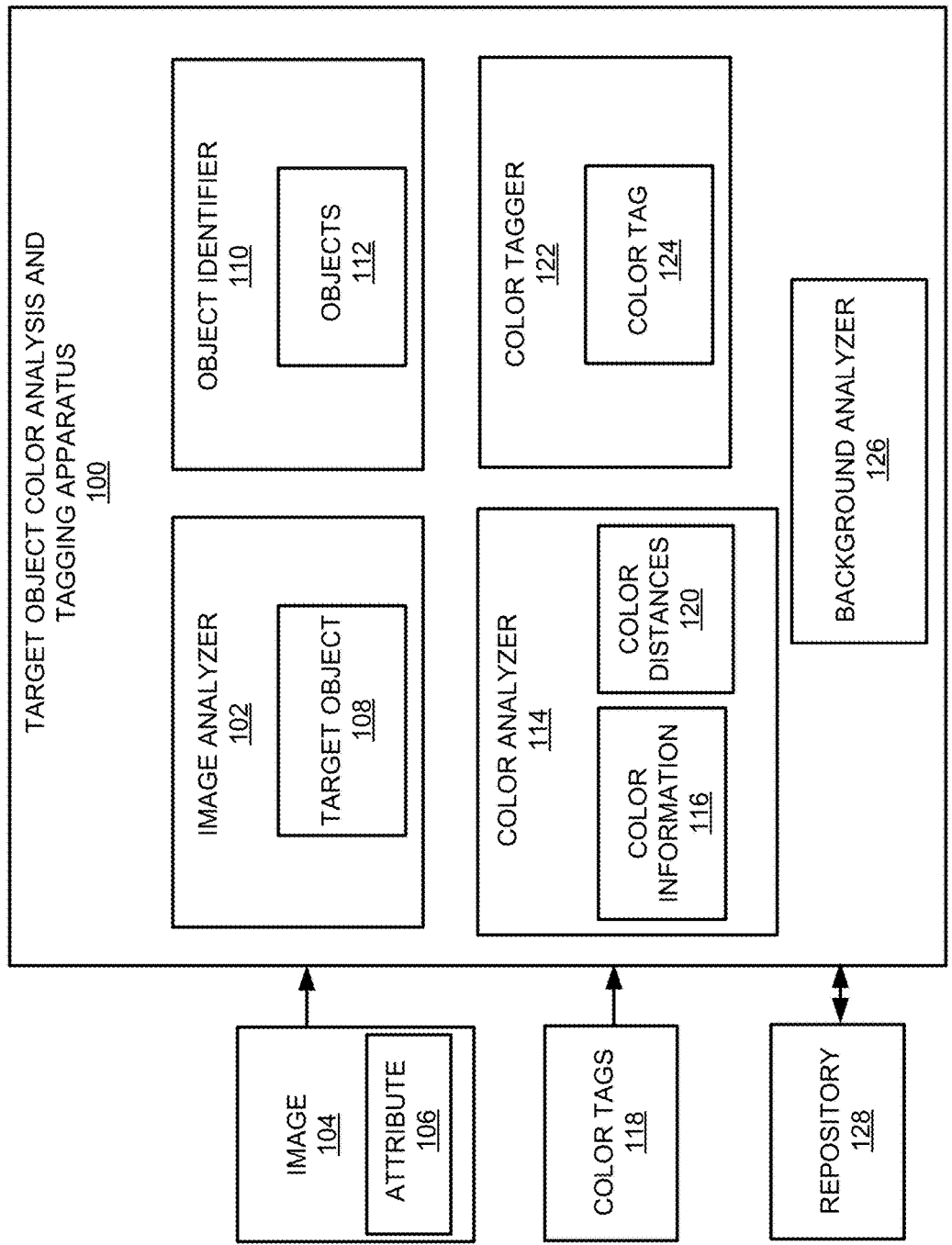
FIG. 1 illustrates a layout of a target object color analysis and tagging apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Target object color analysis and tagging apparatuses, methods for target object color analysis and tagging, and non-transitory computer readable media having stored thereon machine readable instructions to provide target object color analysis and tagging are disclosed herein. The apparatuses, methods, and non-transitory computer readable media disclosed herein provide for color tagging of a target object by assigning a color tag of a plurality of color tags associated with the target object. The target object may include an element such as a person, an animal, clothing worn by a person, furniture near a person, etc., and/or a region of an image, such as the sky, a forest, a road, etc. Color tags may be described as specified colors (e.g., beige, black, blue, red, etc.) that are to be analyzed for assignment to the target object.

In the case of images, videos, and other such sources that include objects, color may be extracted. However, it is technically challenging to extract color from a target object, where it may be uncertain as to what the target object is, and where the target object is located. For example, it is technically challenging to extract color from a target object, where it may be uncertain as to what the target is from a plurality of other objects. It is also technically challenging to determine a color of an object, where the color of the object may need to be matched to a limited number of available colors.

In order to address at least these technical challenges with respect to extraction of color from a target object and determination of a color of an object, the target object color analysis and tagging as disclosed herein provide for assignment of a color tag from a plurality of available color tags to an identified target object by ascertaining, for an image (or a video, or generally another source) that is to be analyzed, an attribute of the image. Examples of an attribute of the image may include text associated with the image, sound associated with the image, a shape (e.g., a face) included in the image, etc. Based on the attribute of the image, a target object that is to be identified and color tagged in the image may be determined.

A plurality of objects may be extracted from the image based, for example, on a learning model. For example, assuming that the target object is a shirt worn by a person, the plurality of objects may include furniture adjacent to the person, other clothes worn by the person, shoes worn by the person, etc.

The target object in the image may be identified based on a comparison of the target object that is to be identified and color tagged in the image and the plurality of extracted objects from the image. For example, assuming that the attribute of the image includes text associated with the image, the target object may be determined by determining, based on an analysis of a repository of available objects based on the text associated with the image, categories of related objects. For example, assuming that the target object is a shirt worn by a person, the categories may include sweaters, t-shirts, jackets, shirts, and other such clothing worn by a person. The categories may further include sub-categories. For example, a sweaters category may include sub-categories that include sleeveless sweaters, sweaters with sleeves, etc.

Color information may be extracted from the identified target object, and a plurality of color tags associated with the identified target object may be ascertained. For example, assuming that the target object is a shirt worn by a person, the color tags may include colors such as beige, blue, green, red, etc.

A plurality of color distances may be determined between the color information and the plurality of color tags. For example, the color distances may represent CIEDE2000 color distances between the color information and the plurality of color tags.

Based on a determination of a minimum color distance from the plurality of color distances, a color tag of the plurality of color tags that is to be assigned to the identified target object may be determined. Further, the color tag may be assigned to the identified target object.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example target object color analysis and tagging apparatus (hereinafter also referred to as "apparatus 100").

Referring to FIG. 1, the apparatus 100 may include an image analyzer 102, which is executed by at least one hardware processor (e.g., the processor 302 of FIG. 3 or the processor 504 of FIG. 5), to ascertain, for an image 104 that is to be analyzed, an attribute 106 of the image 104. Further, the image analyzer 102 is to determine, based on the attribute 106 of the image 104, a target object 108 that is to be identified and color tagged in the image 104. According to an example, the attribute 106 of the image 104 may include audible and/or visible attributes associated with the image 104. According to an example, the target object 108 may include an element and/or a region of the image 104.

An object identifier 110, which is executed by the at least one hardware processor (e.g., the processor 302 of FIG. 3 or the processor 504 of FIG. 5), is to extract, based on a learning model, a plurality of objects 112 from the image 104. Further, the object identifier 110 is to identify, based on a comparison of the target object 108 that is to be identified and color tagged in the image 104 and the plurality of extracted objects 112 from the image, the target object 108 in the image 104.

A color analyzer 114, which is executed by the at least one hardware processor (e.g., the processor 302 of FIG. 3 or the processor 504 of FIG. 5), is to extract color information 116 from the identified target object 108. The color analyzer 114 is to ascertain a plurality of color tags 118 associated with the identified target object 108. Further, the color analyzer 114 is to determine a plurality of color distances 120 between the color information 116 and the plurality of color tags 118.

A color tagger 122, which is executed by the at least one hardware processor (e.g., the processor 302 of FIG. 3 or the processor 504 of FIG. 5), is to determine, based on a determination of a minimum color distance from the plurality of color distances 120, a color tag 124 of the plurality of color tags 118 that is to be assigned to the identified target object 108.

A background analyzer 126, which is executed by the at least one hardware processor (e.g., the processor 302 of FIG. 3 or the processor 504 of FIG. 5), is to determine whether background color (i.e., color of the image other than the color of objects in the image, or color of the image outside of the boundaries of the target object 108) should be removed from the image 104. In this regard, the analysis by the background analyzer 126 may be performed prior to extraction of the color information 116 from the identified target object 108. With respect to determining whether background color should be removed from the image 104, the background analyzer 126 may determine a histogram of a plurality of color clusters, where the color clusters are determined from the entire image 104 (e.g., the extracted color information 116 from the identified target object 108 and color information from a remaining portion of the image 104). The plurality of color clusters may be determined, for example, by using k-means clustering. The background analyzer 126 may sort histogram bins associated with the determined histogram of the plurality of color clusters in descending order. The background analyzer 126 may determine a difference between a highest order bin and a subsequent bin of the sorted histogram bins. The difference may represent a difference between background color and a color of an object. The highest order bin may represent a bin which includes a highest count of color occurrences for a particular color in the image 104, the subsequent bin may represent a bin which includes the second highest count of color occurrences for the particular color in the image 104, and so forth. The background analyzer 126 may determine whether the difference is greater than a specified threshold. For example, the specified threshold may be 40%. In this regard, in response to a determination that the difference is greater than the specified threshold, the background analyzer 126 may remove background color from the image 104. Otherwise, in response to a determination that the difference is less than the specified threshold, the background analyzer 126 may not remove background color from the image 104. In this manner, background color interference with respect to extraction of the color information 116 from the identified target object 108 may be minimized.

According to an example, the attribute 106 of the image 104 may include text associated with the image 104. In this regard, the image analyzer 102 is executed by the at least one hardware processor (e.g., the processor 302 of FIG. 3 or the processor 504 of FIG. 5) to determine, based on the text associated with the image, the target object 108 that is to be identified and color tagged in the image 104 by determining, based on an analysis of a repository 128 of available objects 112 based on the text associated with the image, categories of related objects. According to an example, the categories of related objects may include the target object 108 that is to be identified and color tagged in the image 104. Further, the object identifier 110 is executed by the at least one hardware processor (e.g., the processor 302 of FIG. 3 or the processor 504 of FIG. 5) to identify, based on the comparison of the categories of related objects and the plurality of extracted objects 112 from the image, the target object 108 in the image 104. According to an example, the categories of related objects may be determined as a function of synonyms determined from the text associated with the image 104.

According to an example, the color analyzer 114 is executed by the at least one hardware processor (e.g., the processor 302 of FIG. 3 or the processor 504 of FIG. 5) to extract color information 116 from the identified target object 108 by applying k-means clustering.

According to an example, the color analyzer 114 is executed by the at least one hardware processor (e.g., the processor 302 of FIG. 3 or the processor 504 of FIG. 5) to determine the plurality of color distances 120 between the color information 116 and the plurality of color tags 118 by determining values of $L^*C^*h$ for each of the plurality of color tags 118. In this regard, $L^*$ may represent lightness, $C^*$ may represent chroma, and h may represent a hue angle. The color analyzer 114 may also determine values of $L^*C^*h$ for the extracted color information 116. Further, the color analyzer 114 may determine, based on the $L^*C^*h$ values for each of the plurality of color tags 118 and the L*C*h values for the extracted color information 116, the plurality of color distances 120 between the color information 116 and the plurality of color tags 118.

According to an example, the color analyzer 114 is executed by the at least one hardware processor (e.g., the processor 302 of FIG. 3 or the processor 504 of FIG. 5) to determine the plurality of color distances 120 between the color information 116 and the plurality of color tags 118 by determining CIEDE2000 color distances 120 between the color information 116 and the plurality of color tags 118.

Figure 2:
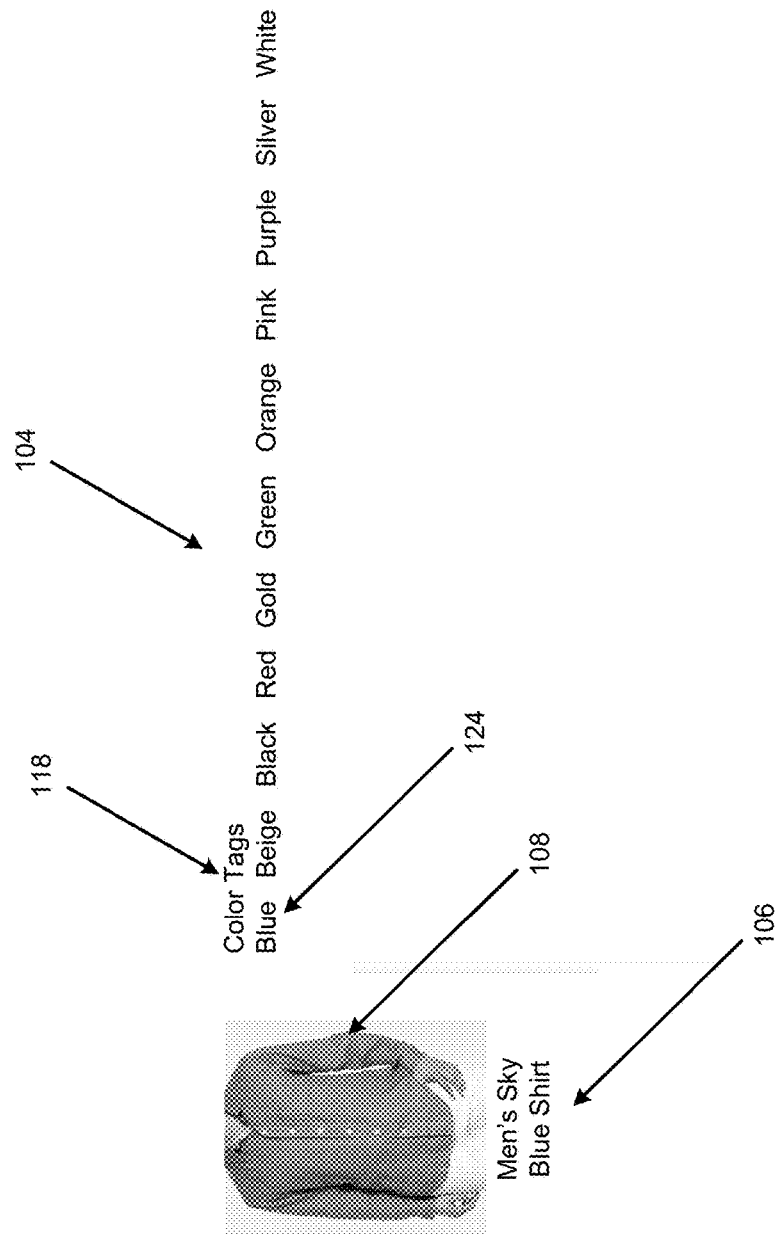
FIG. 2 illustrates an example of color tagging to illustrate operation of the target object color analysis and tagging apparatus of FIG. 1 in accordance with an example of the present disclosure.

FIG. 2 illustrates an example of color tagging to illustrate operation of the apparatus 100 in accordance with an example of the present disclosure.

Referring to FIGS. 1 and 2, as disclosed herein, the image analyzer 102 may ascertain, for the image 104 that is to be analyzed, the attribute 106 of the image 104. For example, as shown in FIG. 2, the image 104 may include the image of a person wearing a shirt. The attribute 106 of the image 104 may include text such as "men's sky blue shirt".

The image analyzer 102 may determine, based on the attribute 106 of the image 104, the target object 108 that is to be identified and color tagged in the image 104. For example, the image analyzer 102 may determine, based on an analysis of the repository 128 of available objects 112 based on the text associated with the image, categories of related objects. For the example of FIG. 2 that includes the image 104 of a person wearing a shirt, the repository may include categories of related objects that include sweaters, t-shirts, shirts, and other such clothing worn by a person. The categories may also include sub-categories. For example, a sweaters category may include sub-categories that include sleeveless sweaters, sweaters with sleeves, etc. The image analyzer 102 may match the attribute 106 (i.e., each component or word of the attribute 106) to the objects in the repository 128, and use data mining techniques such as bag of the words and N-gram to extract features of the attribute 106. In this regard, the extracted features may represent synonyms of the attribute 106, where the synonyms are used to identify the categories present in the repository 128. For the example of FIG. 2 where the target object includes a shirt, synonyms of the attribute 106 may include sweaters, t-shirts, jackets, shirts, and other such clothing worn by a person. Further, for the example of FIG. 2, synonyms of "men's" "sky" and "blue" may also be determined to determine associated categories, but these categories may be eliminated by the object identifier 110 as they do not match to any of the objects extracted from the image 104 as described below.

As disclosed herein, the object identifier 110 may extract, based on the learning model, the plurality of objects 112 from the image 104. For example, the learning model may include a convolutional neural network (CNN) based deep learning model. The CNN may be trained, for example, by the object identifier 110 on product images to provide information in the images. For the example of FIG. 2, the CNN model may provide information such as shirt, pants, etc.

As disclosed herein, the object identifier 110 may identify, based on a comparison of the target object 108 that is to be identified and color tagged in the image 104 and the plurality of extracted objects 112 from the image, the target object 108 in the image 104. For the example of FIG. 2, the object identifier 110 may implement a lexical database of the English language to refine the aforementioned extracted categories to match with object information extracted by using the learning model. For the example of FIG. 2, the object identifier 110 may compare the categories of sweaters, t-shirts, and shirts to the extracted objects that include shirt and pants to identify the target object 108 as shirt. Further, the object identifier 110 may identify aspects such as the location of the target object 108 so that this location information may be used to extract color information from the target object 108.

As disclosed herein, the color analyzer 114 may extract color information 116 from the identified target object 108. For the example of FIG. 2, the color analyzer 114 may extract color information 116 from the identified target object 108 that includes a shirt.

As disclosed herein, the color analyzer 114 may ascertain a plurality of color tags 118 associated with the identified target object 108. For the example of FIG. 2, the color analyzer 114 may ascertain the plurality of color tags 118 that include blue, beige, black, red, etc.

Further, as disclosed herein, the color analyzer 114 may determine a plurality of color distances 120 between the color information 116 and the plurality of color tags 118. In this regard, for the example of FIG. 2, assuming that the color of the shirt is sky blue, and assuming that none of the color tags 118 include sky blue, the color distances 120 between the color information 116 and the plurality of color tags 118 may be used to identify the closest color tag to the color information 116. In this regard, the color tagger 122 may determine, based on a determination of a minimum color distance from the plurality of color distances 120, a color tag 124 (e.g., the color tag blue) of the plurality of color tags 118 that is to be assigned to the identified target object 108. Thus, for the example of FIG. 2, the color tagger 122 may determine that the color tag blue is the closest color tag to the color information 116 for the shirt.

Figure 3:
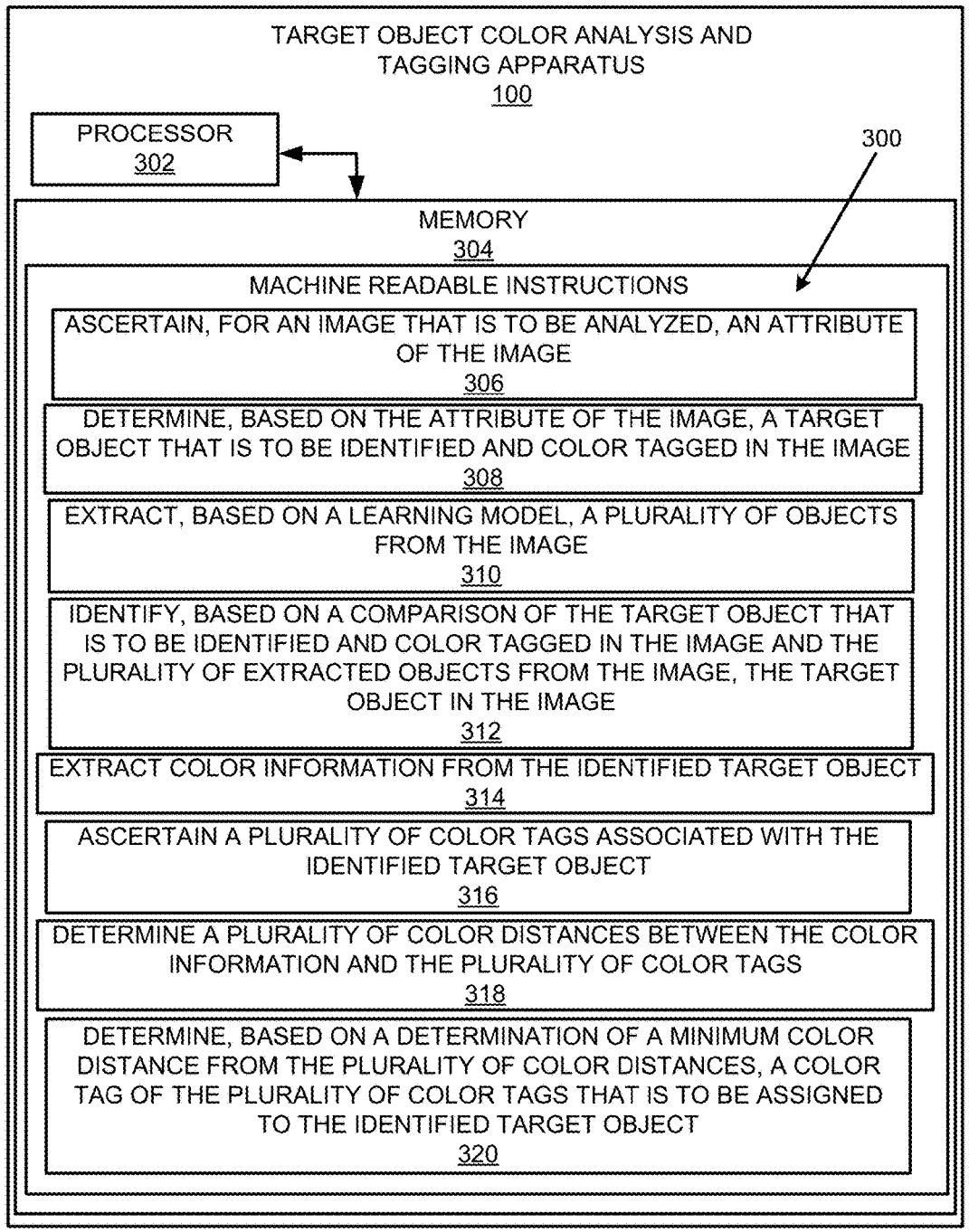
FIG. 3 illustrates an example block diagram for target object color analysis and tagging in accordance with an example of the present disclosure.
Figure 5:
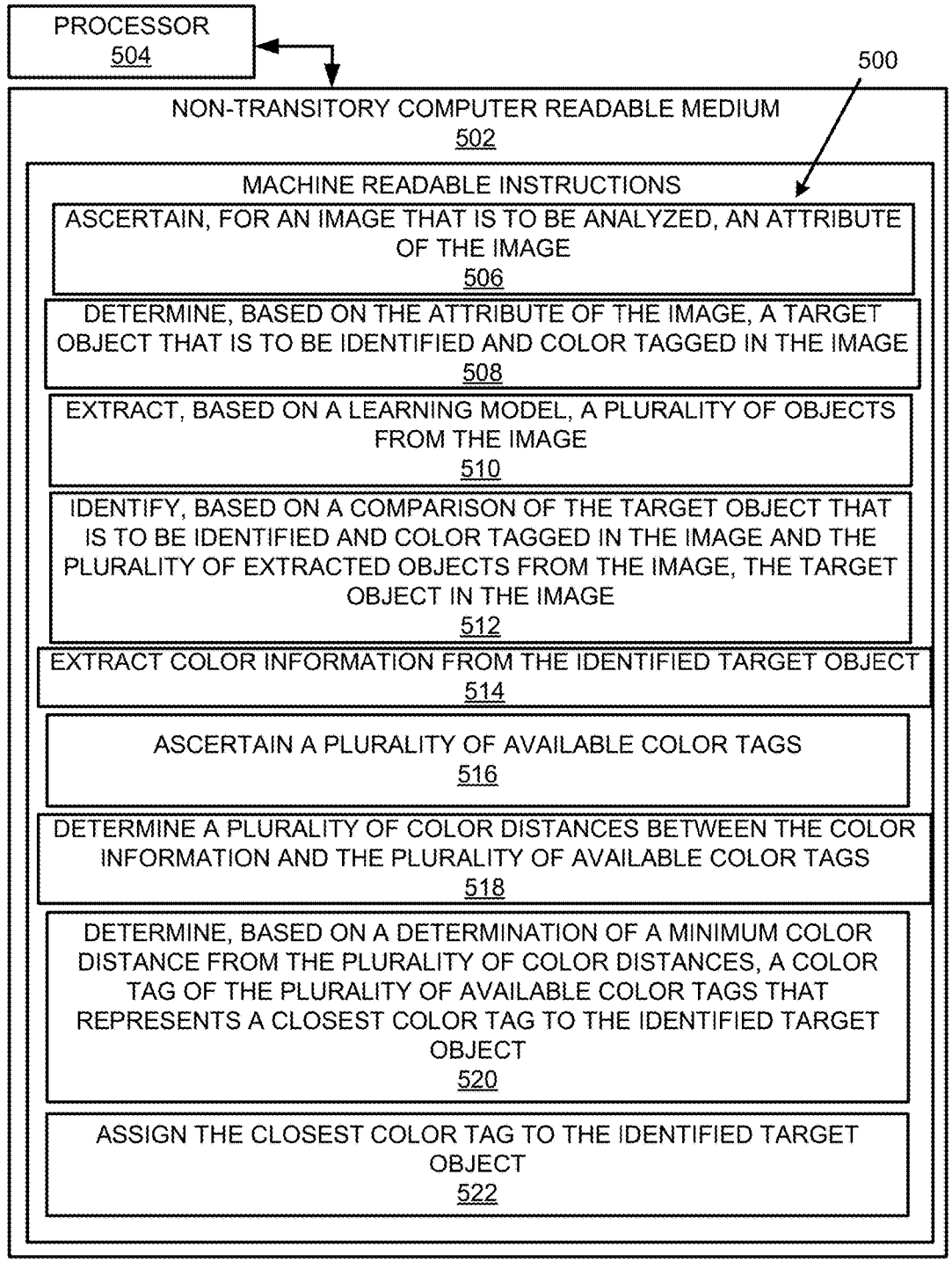
FIG. 5 illustrates a further example block diagram for target object color analysis and tagging in accordance with another example of the present disclosure.

FIGS. 3-5 respectively illustrate an example block diagram 300, a flowchart of an example method 400, and a further example block diagram 500 for target object color analysis and tagging, according to examples. The block diagram 300, the method 400, and the block diagram 500 may be implemented on the apparatus 100 described above with reference to FIG. 1 by way of example and not of limitation. The block diagram 300, the method 400, and the block diagram 500 may be practiced in other apparatus. In addition to showing the block diagram 300, FIG. 3 shows hardware of the apparatus 100 that may execute the instructions of the block diagram 300. The hardware may include a processor 302, and a memory 304 storing machine readable instructions that when executed by the processor cause the processor to perform the instructions of the block diagram 300. The memory 304 may represent a non-transitory computer readable medium. FIG. 4 may represent an example method for target object color analysis and tagging, and the steps of the method. FIG. 5 may represent a non-transitory computer readable medium 502 having stored thereon machine readable instructions to provide target object color analysis and tagging according to an example. The machine readable instructions, when executed, cause a processor 504 to perform the instructions of the block diagram 500 also shown in FIG. 5.

The processor 302 of FIG. 3 and/or the processor 504 of FIG. 5 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 502 of FIG. 5), such as hardware storage devices (e.g., RAM (random access memory), ROM (read only memory), EPROM (erasable, programmable ROM), EEPROM (electrically erasable, programmable ROM), hard drives, and flash memory). The memory 304 may include a RAM, where the machine readable instructions and data for a processor may reside during runtime.

Referring to FIGS. 1-3, and particularly to the block diagram 300 shown in FIG. 3, the memory 304 may include instructions 306 to ascertain, for the image 104 that is to be analyzed, the attribute 106 of the image 104.

The processor 302 may fetch, decode, and execute the instructions 308 to determine, based on the attribute 106 of the image, the target object 108 that is to be identified and color tagged in the image 104.

The processor 302 may fetch, decode, and execute the instructions 310 to extract, based on a learning model, the plurality of objects 112 from the image 104.

The processor 302 may fetch, decode, and execute the instructions 312 to identify, based on a comparison of the target object 108 that is to be identified and color tagged in the image 104 and the plurality of extracted objects 112 from the image, the target object 108 in the image 104.

The processor 302 may fetch, decode, and execute the instructions 314 to extract color information 116 from the identified target object 108.

The processor 302 may fetch, decode, and execute the instructions 316 to ascertain the plurality of color tags 118 associated with the identified target object 108.

The processor 302 may fetch, decode, and execute the instructions 318 to determine the plurality of color distances 120 between the color information 116 and the plurality of color tags 118.

The processor 302 may fetch, decode, and execute the instructions 320 to determine, based on a determination of a minimum color distance from the plurality of color distances 120, the color tag 124 of the plurality of color tags 118 that is to be assigned to the identified target object 108.

Referring to FIGS. 1-2 and 4, and particularly FIG. 4, for the method 400, at block 402, the method may include ascertaining (e.g., by the image analyzer 102), for the image 104 or a video that is to be analyzed, the attribute 106 of the image 104 or the video.

At block 404, the method may include determining (e.g., by the image analyzer 102), based on the attribute 106 of the image 104 or the video, the target object 108 that is to be identified and color tagged in the image 104 or the video.

At block 406, the method may include extracting (e.g., by the object identifier 110), based on a learning model, the plurality of objects 112 from the image 104 or the video.

At block 408, the method may include identifying (e.g., by the object identifier 110), based on a comparison of the target object 108 that is to be identified and color tagged in the image 104 or the video and the plurality of extracted objects 112 from the image 104 or the video, the target object 108 in the image 104 or the video.

At block 410, the method may include extracting (e.g., by the color analyzer 114), color information 116 from the identified target object 108.

At block 412, the method may include ascertaining (e.g., by the color analyzer 114), a plurality of color tags 118 associated with the identified target object 108.

At block 414, the method may include determining (e.g., by the color analyzer 114), the plurality of color distances 120 between the color information 116 and the plurality of color tags 118.

At block 416, the method may include determining (e.g., by the color tagger 122), based on a determination of a minimum color distance from the plurality of color distances 120, the color tag 124 of the plurality of color tags 118 that is to be assigned to the identified target object 108.

Referring to FIGS. 1-2 and 5, and particularly FIG. 5, for the block diagram 500, the non-transitory computer readable medium 502 may include instructions 506 to ascertain (e.g., by the image analyzer 102), for the image 104 that is to be analyzed, the attribute 106 of the image 104.

The processor 504 may fetch, decode, and execute the instructions 508 to determine (e.g., by the image analyzer 102), based on the attribute 106 of the image, the target object 108 that is to be identified and color tagged in the image 104.

The processor 504 may fetch, decode, and execute the instructions 510 to extract (e.g., by the object identifier 110), based on a learning model, the plurality of objects 112 from the image 104.

The processor 504 may fetch, decode, and execute the instructions 512 to identify (e.g., by the object identifier 110), based on a comparison of the target object 108 that is to be identified and color tagged in the image 104 and the plurality of extracted objects 112 from the image, the target object 108 in the image 104.

The processor 504 may fetch, decode, and execute the instructions 514 to extract (e.g., by the color analyzer 114), color information 116 from the identified target object 108.

The processor 504 may fetch, decode, and execute the instructions 516 to ascertain (e.g., by the color analyzer 114), the plurality of available color tags 118.

The processor 504 may fetch, decode, and execute the instructions 518 to determine (e.g., by the color analyzer 114), the plurality of color distances 120 between the color information 116 and the plurality of available color tags 118.

The processor 504 may fetch, decode, and execute the instructions 520 to determine (e.g., by the color tagger 122), based on a determination of a minimum color distance from the plurality of color distances 120, the color tag 124 of the plurality of available color tags 118 that represents a closest color tag to the identified target object 108.

The processor 504 may fetch, decode, and execute the instructions 522 to assign (e.g., by the color tagger 122), the closest color tag to the identified target object 108.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A target object color analysis and tagging apparatus comprising:
   an image analyzer, executed by at least one hardware processor, to
   ascertain, for an image that is to be analyzed, an attribute of the image, and
   determine, based on the attribute of the image, a target object that is to be identified and color tagged in the image;
   an object identifier, executed by the at least one hardware processor, to
   extract, based on a learning model, a plurality of objects from the image, and
   identify, based on a comparison of the target object that is to be identified and color tagged in the image and the plurality of extracted objects from the image, the target object in the image;
a color analyzer, executed by the at least one hardware processor, to
extract color information from the identified target object,
ascertain a plurality of color tags associated with the identified target object, and
determine a plurality of color distances between the color information and the plurality of color tags; and
a color tagger, executed by the at least one hardware processor, to
determine, based on a determination of a minimum color distance from the plurality of color distances, a color tag of the plurality of color tags that is to be assigned to the identified target object.

2. The target object color analysis and tagging apparatus according to claim 1, wherein the identified target object includes at least one of an element and a region of the image.

3. The target object color analysis and tagging apparatus according to claim 1, wherein the attribute of the image includes at least one of audible and visible attributes associated with the image.

4. The target object color analysis and tagging apparatus according to claim 1, wherein the attribute of the image includes text associated with the image, and wherein
the image analyzer is executed by the at least one hardware processor to determine, based on the text associated with the image, the target object that is to be identified and color tagged in the image by
determining, based on an analysis of a repository of available objects based on the text associated with the image, categories of related objects, wherein the categories of related objects include the target object that is to be identified and color tagged in the image; and
the object identifier is executed by the at least one hardware processor to identify, based on the comparison of the categories of related objects and the plurality of extracted objects from the image, the target object in the image.

5. The target object color analysis and tagging apparatus according to claim 4, wherein the categories of related objects are determined as a function of synonyms determined from the text associated with the image.

6. The target object color analysis and tagging apparatus according to claim 1, wherein the color analyzer is executed by the at least one hardware processor to extract color information from the identified target object by applying k-means clustering.

7. The target object color analysis and tagging apparatus according to claim 1, wherein the color analyzer is executed by the at least one hardware processor to determine the plurality of color distances between the color information and the plurality of color tags by:
determining values of L*C*h for each of the plurality of color tags, wherein L* represents lightness, C* represents chroma, and h represents a hue angle;
determining values of L*C*h for the extracted color information; and
determining, based on the L*C*h values for each of the plurality of color tags and the L*C*h values for the extracted color information, the plurality of color distances between the color information and the plurality of color tags.

8. The target object color analysis and tagging apparatus according to claim 1, wherein the color analyzer is executed by the at least one hardware processor to determine the plurality of color distances between the color information and the plurality of color tags by:
determining CIEDE2000 color distances between the color information and the plurality of color tags.

9. The target object color analysis and tagging apparatus according to claim 1, wherein the color analyzer is executed by the at least one hardware processor to extract color information from the identified target object and color information from a remaining portion of the image to determine a plurality of color clusters, further comprising:
a background analyzer, executed by the at least one hardware processor, to
determine a histogram of the plurality of color clusters,
sort histogram bins associated with the determined histogram of the plurality of color clusters in descending order,
determine a difference between a highest order bin and a subsequent bin of the sorted histogram bins,
determine whether the difference is greater than a specified threshold, and
in response to a determination that the difference is greater than the specified threshold, remove background color from the image.

10. A method for target object color analysis and tagging comprising:
ascertaining, by an image analyzer that is executed by at least one hardware processor, for an image or video that is to be analyzed, an attribute of the image or the video;
determining, by the image analyzer that is executed by the at least one hardware processor, based on the attribute of the image or the video, a target object that is to be identified and color tagged in the image or the video;
extracting, by an object identifier that is executed by the at least one hardware processor, based on a learning model, a plurality of objects from the image or the video;
identifying, by the object identifier that is executed by the at least one hardware processor, based on a comparison of the target object that is to be identified and color tagged in the image or the video and the plurality of extracted objects from the image or the video, the target object in the image or the video;
extracting, by a color analyzer that is executed by the at least one hardware processor, color information from the identified target object;
ascertaining, by the color analyzer that is executed by the at least one hardware processor, a plurality of color tags associated with the identified target object;
determining, by the color analyzer that is executed by the at least one hardware processor, a plurality of color distances between the color information and the plurality of color tags; and
determining, by a color tagger that is executed by the at least one hardware processor, based on a determination of a minimum color distance from the plurality of color distances, a color tag of the plurality of color tags that is to be assigned to the identified target object.

11. The method according to claim 10, wherein the identified target object includes at least one of an element and a region of the image or the video.

12. The method according to claim 10, wherein the attribute of the image or the video includes at least one of audible and visible attributes associated with the image or the video.

13. The method according to claim 10, wherein the attribute of the image or the video includes text associated with the image or the video, further comprising:
- determining, by the image analyzer that is executed by the at least one hardware processor, based on the text associated with the image or the video, the target object that is to be identified and color tagged in the image or the video by
  - determining, based on an analysis of a repository of available objects based on the text associated with the image or the video, categories of related objects, wherein the categories of related objects include the target object that is to be identified and color tagged in the image or the video; and
- identifying, by the object identifier that is executed by the at least one hardware processor, based on the comparison of the categories of related objects and the plurality of extracted objects from the image or the video, the target object in the image or the video.

14. The method according to claim 13, wherein determining, by the image analyzer that is executed by the at least one hardware processor, based on the analysis of the repository of available objects based on the text associated with the image or the video, the categories of related objects further comprises:
- determining, by the image analyzer that is executed by the at least one hardware processor, based on the analysis of the repository of available objects based on the text associated with the image or the video, the categories of related objects as a function of synonyms determined from the text associated with the image or the video.

15. The method according to claim 10, wherein extracting, by the color analyzer that is executed by the at least one hardware processor, color information from the identified target object, further comprises:
- extracting, by the color analyzer that is executed by the at least one hardware processor, color information from the identified target object by applying k-means clustering.

16. A non-transitory computer readable medium having stored thereon machine readable instructions, the machine readable instructions, when executed by at least one hardware processor, cause the at least one hardware processor to:
- ascertain, by an image analyzer that is executed by the at least one hardware processor, for an image that is to be analyzed, an attribute of the image;
- determine, by the image analyzer that is executed by the at least one hardware processor, based on the attribute of the image, a target object that is to be identified and color tagged in the image;
- extract, by an object identifier that is executed by the at least one hardware processor, based on a learning model, a plurality of objects from the image;
- identify, by the object identifier that is executed by the at least one hardware processor, based on a comparison of the target object that is to be identified and color tagged in the image and the plurality of extracted objects from the image, the target object in the image;
- extract, by a color analyzer that is executed by the at least one hardware processor, color information from the identified target object;
- ascertain, by the color analyzer that is executed by the at least one hardware processor, a plurality of available color tags;
- determine, by the color analyzer that is executed by the at least one hardware processor, a plurality of color distances between the color information and the plurality of available color tags;
- determine, by a color tagger that is executed by the at least one hardware processor, based on a determination of a minimum color distance from the plurality of color distances, a color tag of the plurality of available color tags that represents a closest color tag to the identified target object; and
- assign, by the color tagger that is executed by the at least one hardware processor, the closest color tag to the identified target object.

17. The non-transitory computer readable medium according to claim 16, wherein the identified target object includes at least one of an element and a region of the image.

18. The non-transitory computer readable medium according to claim 16, wherein the instructions are further to cause the at least one hardware processor to:
- determine, by the color analyzer that is executed by the at least one hardware processor, the plurality of color distances between the color information and the plurality of available color tags by:
  - determining values of L*C*h for each of the plurality of available color tags, wherein L* represents lightness, C* represents chroma, and h represents a hue angle;
  - determining values of L*C*h for the extracted color information; and
  - determining, based on the L*C*h values for each of the plurality of available color tags and the L*C*h values for the extracted color information, the plurality of color distances between the color information and the plurality of available color tags.

19. The non-transitory computer readable medium according to claim 16, wherein the instructions are further to cause the at least one hardware processor to:
- determine, by the color analyzer the is executed by the at least one hardware processor, the color distances that include CIEDE2000 color distances between the color information and the plurality of available color tags.

20. The non-transitory computer readable medium according to claim 16, wherein the instructions are further to cause the at least one hardware processor to:
- extract, by the color analyzer that is executed by the at least one hardware processor, color information from the identified target object and color information from a remaining portion of the image to determine a plurality of color clusters;
- determine, by a background analyzer that is executed by the at least one hardware processor, a histogram of the plurality of color clusters;
- sort, by the background analyzer that is executed by the at least one hardware processor, histogram bins associated with the determined histogram of the plurality of color clusters in descending order;
- determine, by the background analyzer that is executed by the at least one hardware processor, a difference between a highest order bin and a subsequent bin of the sorted histogram bins;
- determine, by the background analyzer that is executed by the at least one hardware processor, whether the difference is greater than a specified threshold; and
- in response to a determination that the difference is greater than the specified threshold, remove, by the background analyzer that is executed by the at least one hardware processor, background color from the image.

* * * * *